Aug. 6, 1946.   W. J. BROWN ET AL   2,405,134
DISTANCE MEASURING SYSTEM
Filed Aug. 3, 1942   2 Sheets-Sheet 1

INVENTOR.
WALTER J. BROWN
JOHN E. SHOMER
BY
ATTORNEY

Patented Aug. 6, 1946

2,405,134

UNITED STATES PATENT OFFICE 2,405,134

DISTANCE MEASURING SYSTEM

Walter J. Brown, Cleveland Heights, and John E. Shomer, Lakewood, Ohio, assignors to The Brush Development Company, Cleveland, Ohio, a corporation of Ohio Application August 3, 1942, Serial No. 453,460

7 Claims. (Cl. 177—386)

This invention relates to distance measuring systems and, more particularly, to methods of and apparatus for depth finding and for the locating of distant underwater objects such as submarines and the like.

It has been proposed heretofore to project a beam of energy toward a distant invisible object and to utilize the reflection thereof in such manner as to give an indication of the bearing and distance away of said object. For that purpose, radio waves, light waves and compressional waves at supersonic frequencies have been advocated and tried, the latter being especially applicable to the locating of objects under water.

Some success has been attained by transmitting compressional waves, at a fixed supersonic frequency, in successive discrete pulses and noting the time elapsing between the transmission of a pulse and the reception of the echo thereof. The pulse system, however, cannot be entirely reliable because many spurious echoes are received from objects, both nearby and distant, that seriously interfere with the recognition and segregation of echoes from objects of the type being searched for. That is an inherent disadvantage of many other known systems and one which had not been overcome satisfactorily before the present invention. In addition to discrete spurious echoes, recurrent echoes, resulting from reverberation, usually cause interference when underwater "pulse" systems are employed.

Also, the signal-to-noise ratio with heretofore known supersonic beam systems of the "pulse" type has not been satisfactory.

It is, accordingly, an object of this invention to provide a distance measuring or depth-finding system, utilizing compressional waves at supersonic frequencies, that shall be substantially free from the defects hereinabove enumerated.

Another object of the invention is to provide a distance measuring system, of the type described, that shall be capable of providing a continuous audible or visible indication of the distance to a reflecting body or surface.

Another object of the invention is to provide a system of the "echo" type that shall be capable of giving a continuous indication of the presence of an object located at a definite distance away from the sending and receiving apparatus.

Another object of the invention is to provide a system of the type described that may be pre-set to give indications of objects at a definite distance therefrom while being substantially immune to spurious echoes arising from reflecting surfaces at other distances.

Another object of the invention is to provide a system of the type described, having an improved signal-to-noise ratio and therefore capable of operating under adverse conditions of local interfering noise.

Another object of the invention is to provide a system of the type described that lends itself particularly well to rapid "scanning" or searching in the general direction in which the presence of objects such as submarines is suspected.

Another object of the invention is to provide a system, of the type described, whereby measurements may be so continuously taken of the distance to an object, such as a submarine or the like, that relative movement of the object toward or away from the observer may be made apparent and the speed of movement estimated.

A still further and more specific object of the invention is to provide a system of the type described that shall require minimum adjustment and balancing during utilization thereof.

In accordance with the invention, the "echo" principle is employed, but means are provided whereby a substantially continuous variable frequency supersonic exploring wave train is transmitted in the general direction of the reflecting object and, if the object is located at the distance for which the system is adjusted, a continous distinctive signal is produced from the echo. The system may be pre-set to explore a region at a definite radial distance from the transmitter and receiver and to substantially ignore echoes from objects nearer or farther away.

In one embodiment of the invention, an underwater supersonic compressional wave is radiated by a directional piezoelectric transducer or the like. The directional pattern may be sharp or broad. The frequency of the transmitted wave is caused to vary periodically and linearly with respect to time between fixed upper and lower limits. A directional supersonic receiver is provided, the tuning of which also is caused periodically to vary linearly at the same rate as the tuning of the transmitter and over the same range. The tuning cycle of the receiver, however, is caused to lag the tuning cycle of the transmitter by a controllable and observable time interval and it accepts only those signals that have required the said time interval to go out to and be reflected back from a remote object.

The receiver may be of the superheterodyne type and the tuning of the heterodyne oscillator may be caused periodically to vary linearly over its range "in step" with the tuning of the receiver, whereby the echo from an object at the distance for which the system is adjusted produces a continuous beat note.

In the embodiment just referred to, the tuning of the transmitter, the receiver and the local oscillator may be accomplished, for example, through utilization of means such as three variable tuning capacitors that are caused to rotate at the same angular velocity. There are a number of ways by which the tuning of the receiver and local oscillator may both be caused to lag a controllable time interval behind the tuning of the transmitter. For example, a common shaft may be utilized for the rotors of the three condensers. In that case, the shaft could be driven by a variable speed motor, the lag then being a function of the speed. Alternatively, the speed of the shaft could be kept constant, and the angular position of the stator of the transmitter tuning capacitor could be adjusted with respect to the stators of the other two capacitors. Additional modifications will be quite obvious to those familiar with radio design.

In the preferred embodiment of the invention, however, electronic instead of mechanical means are employed for causing the frequency of the transmitted compressional wave to periodically vary linearly between the upper and lower limits and an electrical wave corresponding to and in phase with the compressional wave is utilized for the purpose of heterodyning the echo in the receiver.

The novel features that are considered characteristic of the invention are set forth with particularity in the appended claims. The invention itself, however, both as to its organization and its method of operation, together with further objects and advantages thereof, will best be understood by reference to the following description of a specific embodiment, taken in connection with the accompanying drawings, in which:

Figure 1:
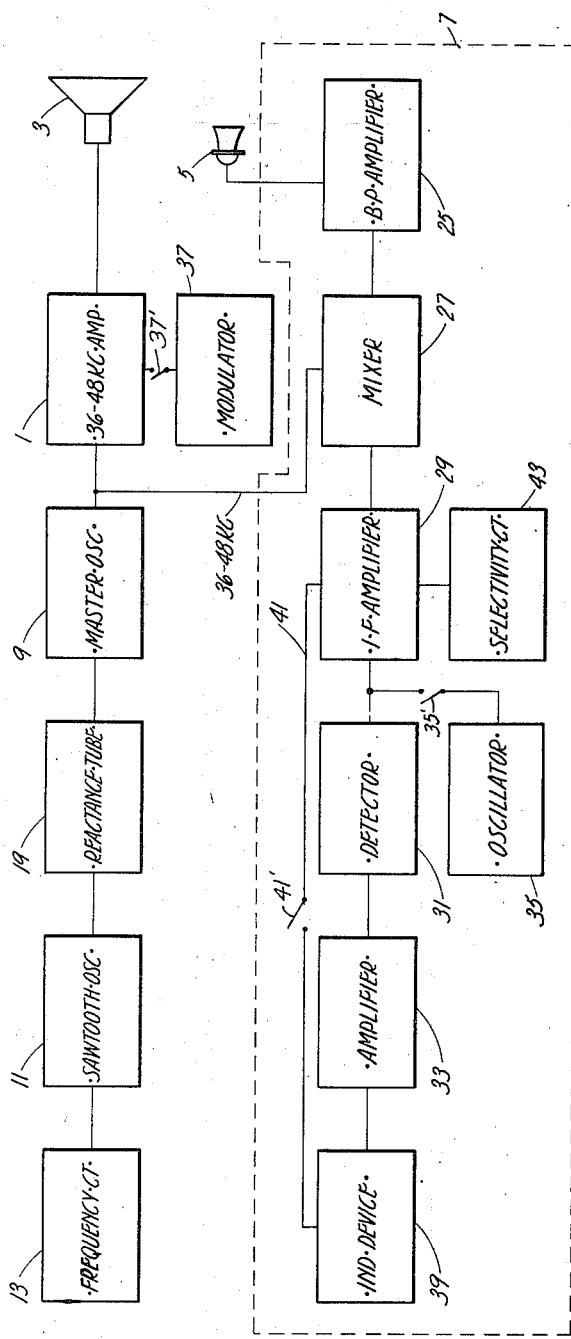
Figure 1 is a generalized block-diagram illustrating a preferred embodiment of the invention.

Referring now to Figure 1 of the drawings, a preferred embodiment of the invention includes a transmitting amplifier 1 that supplies alternating potential or current to an underwater transducer or compressional wave-propagating device 3 which, for purposes of convenience, will be called a "radiator." The radiator 3 may be of any well-known type capable of operation at supersonic frequencies, comprising a diaphragm or the like and piezoelectric, magnetostrictive or other means for imparting vibratory movement thereto.

An underwater microphone 5 is also provided, for the purpose of translating the received echo into electric currents or potentials representative thereof and receiver means, indicated generally by the dotted rectangle 7, are connected to the output terminals thereof for rendering such electrical currents or potentials observable. The specific construction of the radiator 3 and microphone 5 form no part of the present invention; for example, both may be of the piezoelectric type disclosed in the copending application of Frank Massa, Serial Number 431,429, filed February 18, 1942, and assigned to The Brush Development Company.

The radiator 3 may be sharply or broadly directional. If the transmitted beam of supersonic waves is sharply directional, the angle over which the microphone is sensitive may be fairly broad; if the transmitted beam is wide, it is well to utilize a sharply directional microphone. However, the best signal-to-noise ratio, for a given overall directional pattern, is obtained when the radiator and microphone each have a pattern no broader than the overall pattern desired. Means (not shown) may be provided for indicating the directions of transmission and of reception, in order that bearings may be taken during the reception of echoes.

A tunable master oscillator 9 is provided for controlling the frequency of the propagated compressional waves and for simultaneously heterodyning oscillations in the receiver 7 representative of incoming echoes.

For the purpose of causing the tuning of the master oscillator 9 to periodically sweep linearly over its frequency-range at a controllable periodicity, a tunable saw-tooth oscillator 11 is provided. Means 13 are provided for adjusting the frequency of the saw-tooth oscillator, such means, preferably being calibrated in distance-units.

Figure 2:
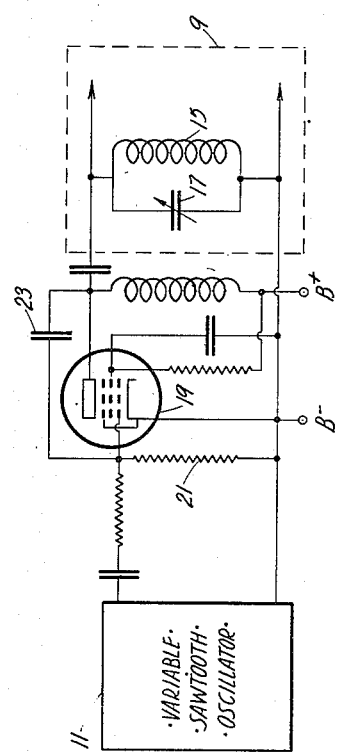
Figure 2 is a circuit diagram illustrating a detail of the system shown in Figure 1.

Full electronic control of the frequency of the master oscillator 9 is obtained by connecting a frequency-determining network included therein, such as an inductor 15 and a capacitor 17 shown in Figure 2, in shunt to the anode and cathode of a reactance tube 19, the input terminals of which are supplied with potentials from the saw-tooth oscillator 11.

A conventional capacitive type of reactance tube circuit is used, and the phase shifting network consists of a grid leak 21, and a capacitor 23 connected between the plate and grid. The reactance of the capacitor 23 over the frequency range covered by the master oscillator is high with respect to the resistance of the grid leak 21.

Inasmuch as the oscillator 11 is connected to the input circuit of the reactance tube, the mutual conductance thereof is caused to vary in accordance with the saw-tooth output potential. This varies the capacitive reactance of the plate circuit of the tube 19 and, consequently, causes the resonant frequency of the tuned circuit 15—17 to also vary in the form of a saw-tooth.

For purposes of convenient explanation, the receiver 7 may be considered as comprising a band-pass amplifier portion 25, a mixer 27, an intermediate frequency amplifier 29, a detector 31 and a power amplifier 33. For the purpose of obtaining an easily observable note, an oscillator 35 is included in the receiver in the event that the transmitted wave is unmodulated. Alternatively, an audio frequency modulator 37 may be connected to the transmitter by closing the switch 37' for the purpose of modulating the radiated pressure wave at a frequency in the range to which the human ear is most sensitive, for example 1500 cycles, in which case switch 35' is opened.

An indicating device designated generally by the numeral 39 is also included. Such device may take the form of a pair of headphones, a loudspeaker or the like for giving an audible signal in response to the reception of an echo, or an oscilloscope may be utilized for such indication in any well-known manner.

All of the circuits may be conventional; for that reason they have not been illustrated in detail.

Alternatively, the audio frequency modulator 37 or the beat frequency oscillator 35, or both, may be omitted and the output of the intermediate frequency amplifier 29 may be applied directly to an appropriate indicating device, such as a cathode ray tube, by closing switch 41' as exemplified by the line connection 41 extending between the intermediate frequency amplifier and the rectangle 39.

Figure 3:
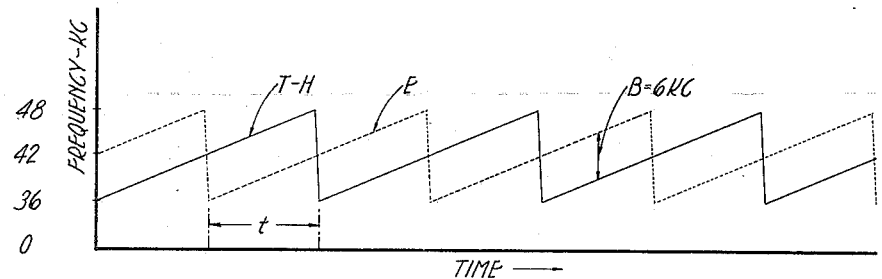
Figure 3 is a composite graph illustrative of the mode of operation of the system exemplified by Figure 1.

Figure 3 is illustrative of the operation of the system when an echo is being received and an indication thereof given. In the figure, the solid line designed "T" and "H" represents a propagated compressional wave that periodically varies linearly in frequency, under control of the saw-tooth oscillator, from a lower limit of 36 kc. per second to an upper limit of 48 kc. per second, and it is also representative of the oscillations simultaneously supplied from the master oscillator 9 to the mixer 27 in the receiver. The dotted line designated "E" is representative of a received echo that lags the transmitted compressional wave by a time interval "t," which is the transit time or the time consumed by a given portion of the wave train in traveling to the reflecting object and returning to the microphone. When the lag between the radiated wave and the received echo is exactly equal to one-half of the saw-tooth cycle, as shown, and the echo is continuous, a constant beat note of 6,000 cycles is produced in the receiver. By using an intermediate frequency amplifier 29 which is tuned to 6,000 cycles, echoes having longer or shorter transit times are rejected and do not affect the indicating device 39. The system, therefore, may be said to be "focused" for the reception of echoes from objects at a definite distance therefrom and the periodicity of the saw-tooth oscillator is the measure of such distance.

It is to be understood that the intermediate frequency amplifier may be provided with an adjustable selectivity control device 43, or with tunable filters or the like, whereby its selectivity is under the control of the operator. Under conditions where considerable interference is experienced, the tuning of the intermediate frequency amplifier may be sharpened. By making the amplifier very selective the signal-to-noise ratio is improved and the distance-selectivity of the system is increased. In other words, by sharpening the discrimination of the intermediate frequency amplifier betwen 6 kc. and adjacent frequencies the "depth of focus" of the beam is decreased and the system becomes more and more selective for the reception of echoes from objects lying at the exact distance away for which the saw-tooth oscillator may momentarily be adjusted. Because of the existence of multiple reflection paths, however, there is a limit to the distance-selectivity that can be obtained and there is a limit also beyond which the signal-to-noise ratio cannot be improved.

The ability of the system to discriminate between echoes from objects at a definte distance away and interfering noise also depends indirectly upon the linearity of the frequency sweep of the master oscillator. Should the oscillator have a non-linear output it is necessary to employ a more broadly tuned intermediate frequency amplifier in the receiver in order to obtain a continuous echo from the distance for which the saw-tooth oscillator frequency is set, and echoes will also be received from objects somewhat closer and others at a somewhat greater distance than that determined by the periodicity of the saw-tooth oscillator.

The limiting supersonic frequencies, i. e., 36 and 48 kc., have been chosen purely for illustrative purposes. The invention is not to be circumscribed by such description, however, inasmuch as other frequency ranges may be utilized.

Figure 4:
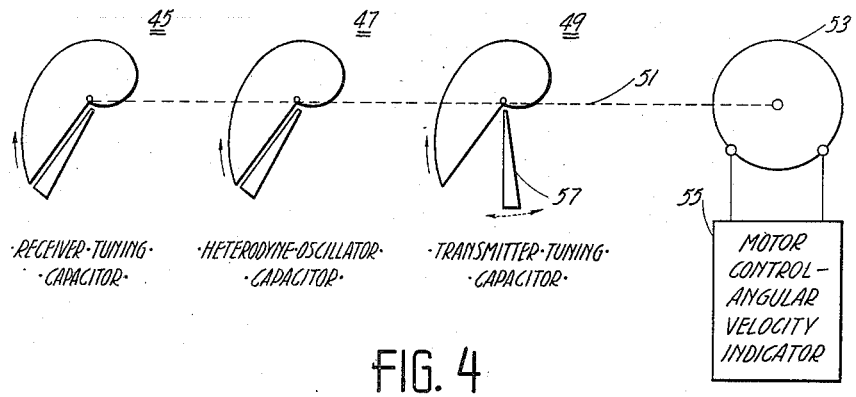
Figure 4 is a conventionalized diagrammatic view to which reference will be made in the explanation of an alternative embodiment of the invention.

In an alternative embodiment of the invention, instead of utilizing electronic means for determining the transmitting and heterodyne frequencies, certain of the objects of the invention may be achieved by employing apparatus wherein the tuning is mechanical. For example, referring to Figure 4 of the drawings, the receiver 7 may comprise a variable input tuning capacitor indicated generally by the numeral 45, a variable heterodyne oscillator tuning capacitor 47, and a variable capacitor 49 may be provided that controls the frequency range of a transmitter or of a master oscillator therefor. The several capacitor rotors may be mounted on a common shaft 51 rotated by a motor 53.

Figure 5:
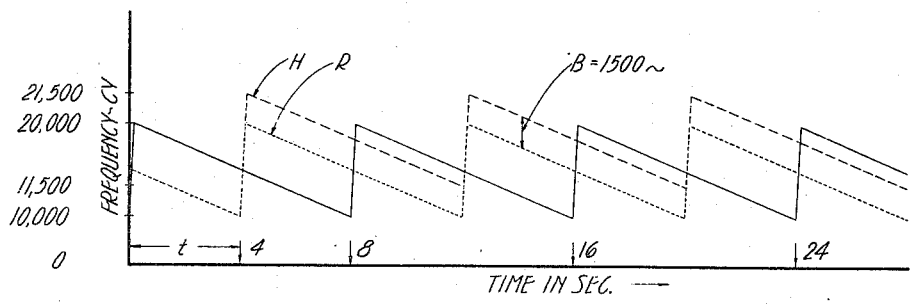
Figure 5 is a compositive graph illustrative of the mode of operation of alternative embodiments of the invention described with reference to Figure 4.

The transmitter tuning condenser is so designed that the compressional wave emitted has a saw-tooth variation in frequency with respect to time, as indicated by the full line in Figure 5. The receiver tuning and heterodyne oscillator tuning capacitors are of the same type; the tuning of the circuits controlled thereby is indicated by the dotted line "R" and the dashed line "H" in Figure 5. The exact design of the capacitors forms no part of the present invention; it is well known to those skilled in the art.

In Figure 5, the tuning of the transmitter is indicated as leading the tuning of the receiver by an interval "t." If such interval corresponds to the "transit time" required for a definite portion of the wave train to go out and be reflected from a distant object, a continuous indication will be given of the existence of a reflecting body.

The distance to the reflecting object, therefore, is proportional to the angular velocity of the tuning capacitors and may be read from a properly calibrated speed control device 55 connected to the motor 53. "Searching" may be accomplished by varying the speed of the motor 53 until a continuous echo manifests itself. Alternatively, as indicated by the dotted arc in Figure 4, the stator 57 of the transmitter tuning capacitor 49 may be provided with an angular adjusting device (not shown) whereby, keeping the motor speed constant, the lag "t" may be varied and the distance to the reflecting object may be determined.

Also, it lies within the scope of the invention to utilize two synchronous motors for actuation of the transmitter and receiver tuning devices and to provide calibrated means whereby the rotor of one of the motors may be angularly changed with respect to the position of the rotor of the other motor whereby the "lag" may be varied and observed.

The transmitter frequency range, 10,000 to 20,000 cycles per second, and the heterodyne oscillator range, 11,500 to 21,500 cycles per second, exemplified by Figure 5, are not critical; they were chosen merely for the purpose of providing a readily observable beat note of 1,500 cycles.

Apparatus constructed according to this invention is believed to be materially more accurate than apparatus of analogous types heretofore known. The accuracy may be attributed largely to that characteristic of the system which enables the searching beam of compressional waves to be "focused," so to speak, at a definite distance away, whereby indications are not given of the presence of nearer or farther objects.

Other advantages of the system will be apparent to those who are familiar with the art of distance measuring by the echo method as also will be numerous modifications thereof.

The invention, therefore, is not to be limited except insofar as is necessitated by the prior art and by the spirit of the following claims.

We claim:

1. In a distance measuring system, means for producing electrical waves at supersonic frequencies, means for causing the frequency of said waves to vary as a saw-tooth over a range having definite upper and lower limits, means for causing the frequency variation to recur periodically at a definite adjustable rate, means for converting said electrical waves into compressional waves in a given medium, means for receiving said compressional waves after reflection from a remote object, means for converting said received compressional waves into electrical waves representative thereof, connections for combining said representative electrical waves with waves from the first mentioned electrical wave producing means to produce therefrom electrical waves at lower frequencies and means for selecting waves at substantially a single frequency from said last mentioned waves, said single frequency being the difference between either the upper or the lower limit of the frequency range and the median frequency thereof.

2. In a distance measuring system, means for producing electrical waves at supersonic frequencies, means for causing the frequency of said waves to vary as a saw-tooth over a definite range having upper and lower limits, means for causing the frequency variation to recur periodically at a determinable rate to focus said system substantially at a given distance, means for converting said waves into compressional waves in a given medium, means for receiving said compressional waves after reflection from a remote object and for converting them into electrical waves representative thereof, connections for combining said representative waves with electrical waves simultaneously produced by the first mentioned means to produce thereby electrical waves at frequencies lower than supersonic, means for selecting waves at substantially a single frequency from said lower frequency waves, said single frequency being the difference between either of the frequency limits of the transmitted supersonic compressional waves and the median frequency of the range of frequencies thereof, and means for rendering observable said lower frequency waves whereby an indication may be had of the distance to said remote object only if said remote object is located substantially at said focus distance.

3. In a distance measuring system, means including an electrical wave amplifier for causing compressional waves at supersonic frequencies to be set up in a given medium and directed toward a remote object, means for receiving compressional waves reflected back from said object, means for converting said received waves into representative electrical waves, a tunable master oscillator, control means for causing the master oscillator to sweep periodically and linearly in a saw-tooth manner over a tuning range having definite upper and lower frequency limits, means for adjusting the sweep frequency of said master oscillator, connections for supplying oscillations from said master oscillator to said electrical wave amplifier, means for simultaneously utilizing oscillations from said master oscillator to produce from said representative electrical waves further electrical waves at a lower frequency, means for selecting waves at substantially a single frequency from said lower frequency waves, said lower frequency being the difference between either of the frequency limits of the transmitted supersonic compressional waves and the median frequency of the range of frequencies thereof and means for rendering said lower frequency waves observable.

4. In a distance measuring system, means for amplifying electrical waves at supersonic frequencies, a directional supersonic compressional wave radiator connected to said amplifying means to be energized thereby, a tunable source of electrical waves at supersonic frequencies for supplying said amplifier, means for receiving compressional waves reflected from a remote object, means for deriving electrical waves from the received compressional waves, a control oscillator of the saw-tooth type, means whereby the tuning of the tunable source is caused to vary periodically and linearly over a frequency range having an upper and a lower limit under control of the saw-tooth oscillator, means for controlling the period of the saw-tooth oscillator means for mixing electrical waves from said tunable source with electrical waves representing received compressional waves to provide thereby electrical waves at frequencies lower than the frequencies of the said compressional waves, means for segregating from said lower frequency waves a narrow band thereof approximating in frequency the difference between either of the range-limiting frequencies and the median frequency of the range, and means for producing an observable indication from said band, whereby the distance between the radiator and the wave reflecting object may be determined from the periodicity of the saw-tooth oscillator.

5. In a distance measuring system, means of the saw-tooth type for generating oscillatory energy the frequency of which varies according to a linear periodic function with respect to time, adjustable means for establishing a given period of frequency variation thereby establishing a focus distance for said system, means for transmitting a portion of the oscillatory energy generated to a remote object, means for receiving oscillatory echo energy from said remote object and for deriving oscillatory electrical energy therefrom, means for combining the derived oscillatory electrical energy with another portion of the generated oscillatory energy to produce oscillatory beat energy having a substantially constant frequency when said remote object is substantially at the focus of said system and which frequency is unrelated to the distance between said transmitter and said remote object, indicating means, means connected to said indicating means for selecting and passing energy waves at substantially a single frequency which corresponds to said constant frequency and for rejecting all other energy waves whereby said indicating means indicates the presence of said remote object only if it lies substantially at the focus of said system, the period of variation of said oscillatory energy generating means when said indicating means indicates the presence of a remote object being a measure of the distance to the remote object.

6. In a distance measuring system, tunable means for generating electric currents at supersonic frequencies, controllable means for causing the frequency of the generated currents to recurrently vary linearly in a saw-tooth manner between predetermined limits, adjustable means for varying the periodicity of said recurrence, means for translating said currents into a train of compressional waves in a given medium, means for receiving said wave train after reflection from a remote object and for deriving from said wave train electric currents representative thereof, an indicating device, means for causing the generated electric currents at supersonic frequencies to interact with the currents representative of received compressional waves to thereby provide a beat-frequency current for actuating said indicating device, and means comprising an electrical filter interposed between said indicating device and said beat-frequency deriving means, said filter being tunable to pass frequencies of the order of one-half the difference between the frequency limits of the compressional wave train to cause said beat-frequency current to actuate said indicating device only if said remote object is located substantially at a given focus distance.

7. The method of detecting the presence of a remote object in contact with a given medium, that comprises continuously generating compressional waves in said medium, directing said waves toward the general location wherein the presence of an object is suspected, periodically linearly varying the frequency of the waves in a saw-tooth manner at a given rate between a definite upper and a definite lower limit, receiving compressional waves reflected from objects in the path of the directed waves, producing from said received waves an electrical quantity representative thereof, interacting said produced electrical quantity with an alternating electrical quantity that is continuously representative of the directed waves to thereby produce further alternating electrical quantities, selecting from said quantities a quantity at substantially a single frequency which is substantially equal to half of the difference between the frequency limits of the range of variation of the directed-wave frequencies, providing an indication of the distance to an object by observing the rate at which the compressional waves vary between the set definite upper and lower limits, and selectively changing said rate whereby the focus of said system is changed.

WALTER J. BROWN.
JOHN E. SHOMER.

Disclaimer 2,405,134.—*Walter J. Brown*, Cleveland Heights, and *John E. Shomer*, Lakewood, Ohio. DISTANCE MEASURING SYSTEMS. Patent dated Aug. 6, 1946. Disclaimer filed May 18, 1959, by the assignee, *Clevite Corporation*.

Hereby enters this disclaimer to claim 5 of said patent.

[*Official Gazette July 7, 1959.*]

Notice of Adverse Decision in Interference

In Interference No. 84,436, involving Patent No. 2,405,134, W. J. Brown and J. E. Shomer, Distance measuring systems, final judgment adverse to the patentees was rendered March 27, 1959, as to claim 5.

[*Official Gazette October 13, 1959.*]